(12) United States Patent
Hosseinali et al.

(10) Patent No.: US 7,652,853 B2
(45) Date of Patent: Jan. 26, 2010

(54) THIN SHIELD STRUCTURE FOR REDUCED PROTRUSION IN A MAGNETORESISTIVE HEAD

(75) Inventors: Gity Samadi Hosseinali, Palo Alto, CA (US); Vladimir Nikitin, Campbell, CA (US); Robert Langland Smith, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 385 days.

(21) Appl. No.: 11/191,767

(22) Filed: Jul. 28, 2005

(65) Prior Publication Data

US 2007/0025026 A1 Feb. 1, 2007

(51) Int. Cl.
G11B 5/33 (2006.01)
(52) U.S. Cl. ..................................... 360/319
(58) Field of Classification Search ................. 360/319
See application file for complete search history.

(56) References Cited

U.S. PATENT DOCUMENTS

| | | | | |
|---|---|---|---|---|
| 4,789,910 A | | 12/1988 | Otsuka et al. | 360/113 |
| 4,843,506 A | * | 6/1989 | Gill et al. | 360/319 |
| 5,901,432 A | * | 5/1999 | Armstrong et al. | 29/603.14 |
| 5,930,086 A | | 7/1999 | Chaug et al. | 360/113 |
| 5,995,343 A | * | 11/1999 | Imamura | 360/126 |
| 6,337,784 B2 | | 1/2002 | Narumi et al. | 360/319 |
| 6,344,954 B1 | | 2/2002 | Redon et al. | 360/324.2 |
| 6,381,107 B1 | | 4/2002 | Redon et al. | 360/324.2 |
| 6,385,015 B2 | | 5/2002 | Narumi et al. | 360/319 |
| 6,396,670 B1 | | 5/2002 | Murdock | 360/319 |
| 6,400,537 B2 | | 6/2002 | Sakakima et al. | 360/324.2 |
| 6,469,868 B2 | * | 10/2002 | Yamamoto et al. | 360/125.71 |
| 6,530,141 B2 | | 3/2003 | Komuro et al. | 29/603.14 |
| 6,597,545 B2 | | 7/2003 | Macken et al. | 360/319 |
| 6,600,314 B2 | * | 7/2003 | Kou | 324/252 |
| 6,687,096 B2 | | 2/2004 | Sasaki et al. | 360/317 |
| 6,700,752 B2 | | 3/2004 | Dimitrov et al. | 360/317 |
| 6,721,138 B1 | | 4/2004 | Chen et al. | 360/317 |
| 6,873,499 B2 | * | 3/2005 | Lee et al. | 360/321 |
| 7,028,743 B1 | * | 4/2006 | Wang et al. | 164/46 |
| 7,293,344 B2 | * | 11/2007 | Han et al. | 29/603.13 |
| 2003/0174446 A1 | * | 9/2003 | Hasegawa | 360/319 |
| 2003/0197981 A1 | * | 10/2003 | Ishiwata | 360/319 |
| 2003/0214759 A1 | * | 11/2003 | Kim | 360/319 |
| 2006/0245114 A1 | * | 11/2006 | Guan et al. | 360/319 |

* cited by examiner

*Primary Examiner*—Angel A. Castro
(74) *Attorney, Agent, or Firm*—Zilka-Kotab, PC

(57) ABSTRACT

A magnetic data recording head having reduced thermally induced shield (pole tip) protrusion. The head includes a magnetoresistive sensor sandwiched between first and second shield. The shields have a substantially reduced thickness. The distance between the shields defines a gap (G) and the shields each have a thickness (ST) such that the ratio ST/G is greater than 2, but less than 50. More preferably the ratio ST/G is greater than 2, but less than 20, and yet more preferably, the ratio ST/G is greater than 2 and less than 10.

18 Claims, 4 Drawing Sheets

THIN SHIELD STRUCTURE FOR REDUCED PROTRUSION IN A MAGNETORESISTIVE HEAD

FIELD OF THE INVENTION

The present invention relates to magnetic recording heads, and more particularly to a structure for reducing head disk contact caused by thermally induced shield protrusion.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is biased parallel to the ABS, but is free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic, electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, magnetic heads (read and write) have been made ever smaller. Reducing the size of such sensor increases the amount of data that can be stored on a disk. For example, reducing the track width of the sensor and the write element increases the number of data tracks that can be recorded onto a disk. In addition, decreasing the gap (distance between the sensor shields) decreases the bit length, and therefore increases the amount of data that can be recorded on a given length of data track.

In this effort to decrease size and increase data capacity and data rate, data recording systems have been designed with ever smaller fly heights. The fly height is the distance between the air bearing surface (ABS) of the read/write head and the surface of the magnetic medium. This decreased fly height, however, greatly increases the chances of a head disk contact during operation. Such contact can be catastrophic for several reasons. For instance, such contact results in a heat spike in the head, which can lead to demagnetization of the pinned layer or loss of free layer biasing, rendering head unusable. In addition, data loss can occur due to damage to the magnetic medium during such contact.

The chances of such a head disk contact occurring at such low fly heights increase dramatically when a portion of the head protrudes from the ABS. Such protrusion can be the result of what is called "thermal protrusion". Certain elements of the head, such as magnetic shields of the read head have thermal expansion coefficients that are larger than other portions of the head, such as the alumina insulation layers. As the ambient temperature or the temperature inside the disk drive increases, the shield, having a higher thermal expansion coefficient, will protrude out past the ABS. One possible solution might be to find a shield material that has a thermal expansion coefficient that is similar to the other materials making up the head. However, no materials are currently available that posses both the desired magnetic properties for a magnetic shield and also a desired thermal expansion coefficient.

Therefore, there is a strong felt need for a head structure that can reduce the thermally induced protrusion of magnetic shields in a magnetic head used in a data recording system. Such a system must not compromise magnetic performance including signal resolution such as the PW50 performance of the magnetic recording system.

SUMMARY OF THE INVENTION

The present invention provides a magnetic head having reduced thermally induced shield (pole tip) protrusion. The thermally induced protrusion of magnetic shields is controlled by limiting the thickness of the shields.

A structure according to an embodiment of the invention has a magnetoresistive sensor that is located between first and second magnetic shields. The distance between the shields defines a gap (G) and each of the shields has a thickness (ST). According to an embodiment of the invention, the ratio of shield thickness to gap (ST/G) is between 2 and 50.

The ratio ST/G may be between 2 and 20 or may even be between 2 and 10. The reduced thickness of the shields advantageously prevents the shields from protruding out past the ABS during operation of the head. The shield to gap ratio ST/G can be reduced down to about 2 without degrading signal resolution.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
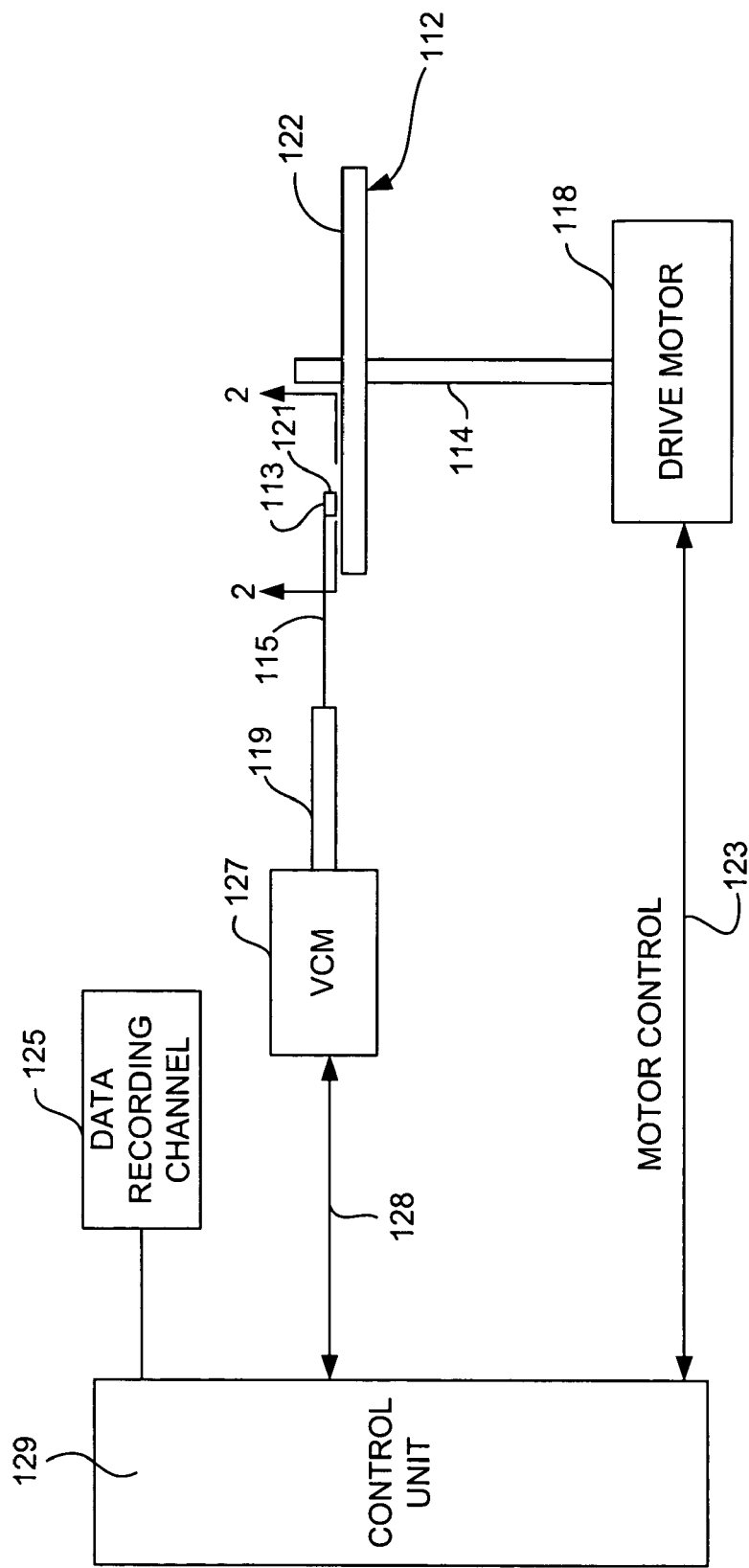
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
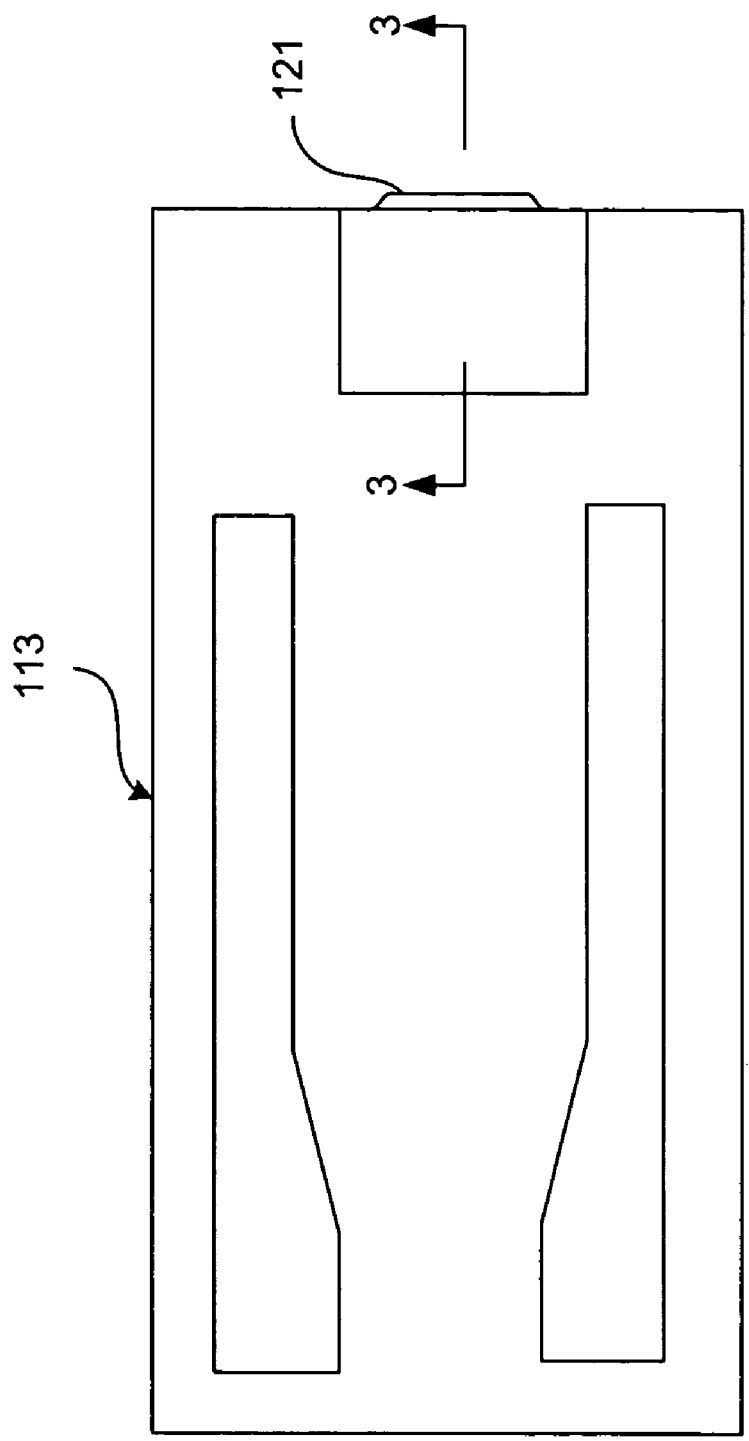
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
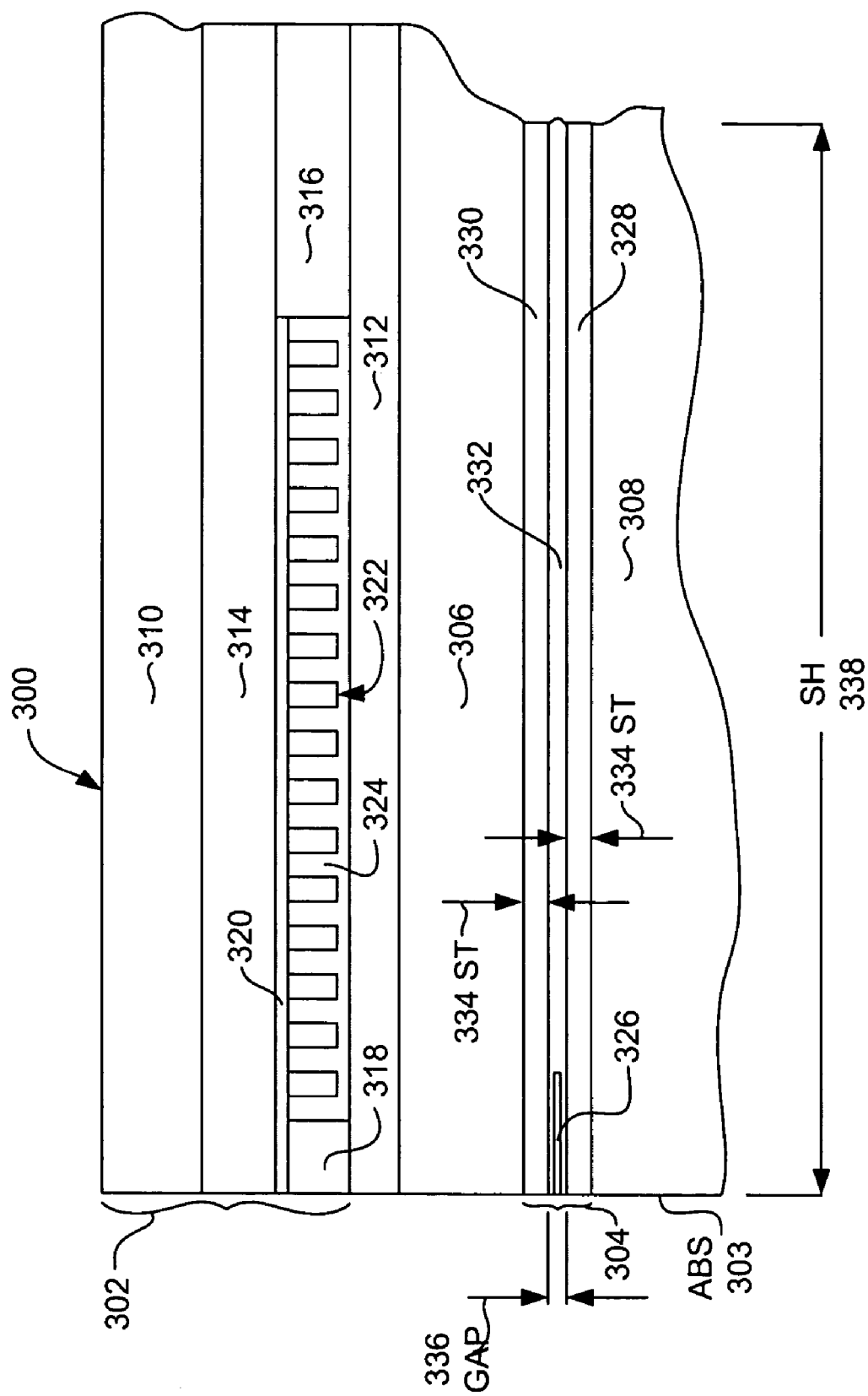
FIG. 3 is a cross sectional view of a magnetic sensor according to an embodiment of the present invention taken from line 3-3 of FIG. 2.

With reference now to FIG. 3, a magnetic head 300 includes a read head 304, and a write head 302, having ends that terminate at an air bearing surface (ABS) 303. The read head and write heads may be separated by a non-magnetic, electrically insulating layer 306, which may be for example alumina ($Al_2O_3$). The read head 304 is built upon a substrate 308, which may be alumina or may be slider material such as titanium carbide. A protective layer 310, constructed of, for example, alumina may be provided over the write head to protect the write and read heads 302, 304 from damage such as by corrosion.

With reference still to FIG. 3, the write head includes first and second magnetic pole pieces 312, 314 that are magnetically connected to one another by a magnetic back gap portion 316. A magnetic pedestal 318 may be connected with one of the first and second poles 312, 314, being separated from the other magnetic pole by a write gap layer 320, which is constructed of a non-magnetic material such as alumina or silicon oxide. A magnetic coil 322, a portion of which is shown in cross section in FIG. 3, passes between the first and second poles. The coil 322 can be constructed of, for example, Cu and is insulated by a non-magnetic, electrically insulating material 324 such as alumina.

The magnetic poles 312, 314, back gap 316 and pedestal are all constructed of one or more magnetic materials such as CoFe or NiFe and form a magnetic yoke. When electrical current flows through the coil 322, a magnetic field from the coil magnetizes the yoke, generating a fringing field at the write gap 320 in the pole tip region, thereby writing a magnetic bit onto a nearby magnetic medium.

With reference still to FIG. 3, the read head 304 includes a magnetoresistive sensor 326, such as a GMR sensor or tunnel valve, which is sandwiched between first and second magnetic shields 328, 330, which are constructed of a magnetic material such as NiFe. The sensor 326 is encased in a non-magnetic, electrically insulating gap material 332 such as alumina. It should be pointed out that if the sensor 326 is a current perpendicular to plane GMR sensor or tunnel valve, the shields 330, 328 would most likely contact the sensor 326 rather than being separated from it and would serve as electrical leads for providing a sense current to the sensor 326. On the other hand, if, the sensor 326 is a current in plane sensor, then the sensor 326 would be insulated and separated from the shields 328, 330 by the insulating gap layer 332. Electrical leads (not shown) would then extend between the shields 328, 330 through the gap material 332 to provide a sense current to the sensor 326.

The push for ever greater data capacity and data rate constantly push sensor designs to ever smaller sizes. For example decreasing the track width of a sensor increases the number of tracks that can be fit onto a given area of medium. Decreasing the gap (distance between the shields 328, 330) increases the number of bits of data that can be fit onto a give length of data track. Since all of the dimensions of the head 300 must scale together, all of the various dimensions of the head 300 must be reduced roughly proportionally to the others.

For example, the push for greater head performance requires decreasing fly height of the head. The fly height is the distance between the ABS 303 of the head 300 and an adjacent magnetic medium during operation. In current heads, the fly height is becoming so small, that any slight protrusion of a portion of the head 300 can cause that portion of the head to contact the disk during operation. This can cause catastrophic damage such as loss of data due to damage to the medium, or complete head failure due to the resulting heat spike.

A major contributor to such protrusion has been caused by the differences in thermal expansion coefficients of various portions of the head, especially differences between the thermal expansion coefficients of the shields 328, 330 and the surrounding materials. The higher thermal expansion coefficient of the materials making up the shields 328, 330, relative to that of the rest of the head 300, causes the shields 328, 330 to protrude outward at the ABS 303, when the head 300 heats up during operation. This is known as thermal protrusion.

This catastrophic thermal protrusion can be avoided by carefully controlling the thickness of the shields 328, 330. The shields have a thickness (ST) 334 and have a height 338 measured from the ABS. The distance between the shields 336 defines the gap (G) and determines the bit length. As can be seen with reference to FIG. 3, the gap G is measured from the inner most portions of each shield 328, 330, (ie. the nearest portion of each shield with respect to the other shield). To reduce temperature-induced protrusion, the thickness of the shields needs to be reduced. The thinner the shields are made, the less the shields will protrude with increased temperature. There is, however, a limit to how much the shield thickness can be reduced. If the ST/G ratio is less than 2 signal definition (PW50) suffers. It has been discovered, however, that reducing the shield thickness to no less than a ST/G ratio of 2 does not significantly affect PW50 performance. Therefore, the ST/G ratio should not be less than 2.

As mentioned above, various portions of the head 300 scale together so that the reduction of one dimension of a component may require the reduction of another dimension. This is true for the shields as well. If the shield height SH is not reduced with the shield thickness ST, the drive field required for agreement of ultra-quasi amplitude test becomes impracticably large. Therefore, as the shield thickness ST decreases, the shield height SH 338 should also be reduced accordingly. If the shield height SH 338 is not reduced with the shield thickness, the drive field required for agreement of ultra-quasi amplitude test becomes small, but two problems occur. The first problem is that during operation, the shields are too sensitive to magnetic stray fields during operation causing possible disk erasure by the shields, destabilization of the read sensor and changes to its bias point and saturation. The second problem is that the shields have a non-linear response if the applied field ($H_o$) exceeds the shield demagnetizing field which artificially distorts the transfer curve during quasi-static testing. For example, in two dimensions the shield demagnetizing factor in Oersteds is roughly (4 piMs) (ST/SH) where Ms is the shield saturation magnetization. On the other hand, the reduced shield height SH 338 allowed by the thinner shields advantageously prevents shield shorts by providing less shield area between which the sensor and leads must be sandwiched. In a sensor having a very small gap 336 this reduction in shield shorting is a great advantage in significantly increasing the number of usable sensors that can be produced on a given wafer. This is also an advantage for CPP read sensors.

Traditionally, the shield to gap ratios ST/G in prior art heads have not scaled with reductions in fly-height, because of concerns about joule heat dissipation. During head operation, the sense current flowing through the read sensor causes it to heat up. This self-heating creates a limitation on the maximum allowable sense current. The heat generated in the sensor is partially dissipated through the shields. The concern has been that if the shields were made excessively thin, this might limit the heat flow and cause increase in the sensor temperature. That would lead to undesired reduction in sense current, limiting signal amplitude. It has been found, however, that heat dissipation is not degraded with thin shields in the range of interest. Experiments have demonstrated that heating delta-R is similar for ultra thin, thin and thick (control) shields. Thermal contact resistance at film interfaces may dominate heat dissipation.

Figure 4:
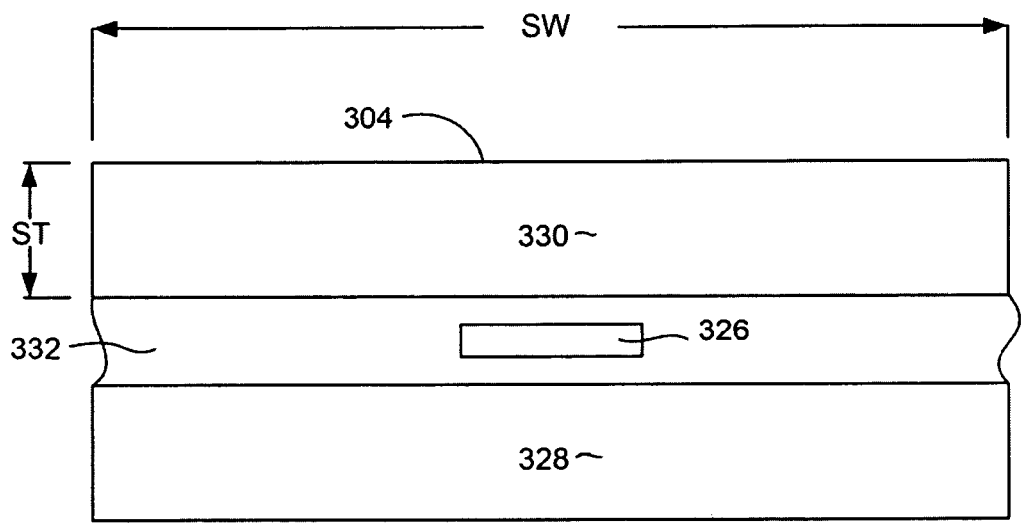
FIG. 4 is a view of the magnetic sensor as viewed from the air bearing surface (ABS).

In a head according to the presently described embodiment, the gap 336 is preferably less than 1000 nm, and more preferably between 1 nm and 1000 nm. The shields preferably have a thickness ST 334 of less than 5 um, preferably between 0.01 um and 5 um. The shields also each have a width (SW) that is the width as measured into the plane of the page in FIG. 3. The width (SW) is shown in FIG. 4, which shows a view of the read head 304 as viewed from the air bearing surface (ABS). The shield dimensions ST, SW, SH and Ms(s) are chosen so that (1) the shield demagnetizing field exceeds the drive field $H_o$ in any quasistatic testing and (2) $H_o$ is practical (not too big) and (3) $H_o$ is not so small that stray fields during manufacture and operation in the HDD won't cause an unwanted signal in the head or data erasure on the disk. A practical value for an applied field $H_o$ is from 1-10,000 Oe, and has traditionally been between 10 and 1,000 Oe.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic head having an air bearing surface (ABS) for use in a data recording system, the magnetic head comprising:
   a magnetic write head; and
   a magnetic read head separated from the magnetic write head by a non-magnetic, electrically insulating material, the magnetic read head further comprising:
   first and second magnetic shields, each shield having a thickness (ST), the first and second shields being separated by a gap (G); and
   a magnetoresistive sensor sandwiched between the shields;
   wherein each of the shields has a thickness such that ST/G is less than 50 and greater than 2;
   wherein the first and second shields each have a shield height (SH), a shield width (SW), and a saturation magnetization (Ms(s)) and wherein ST, SW, SH and Ms(s) are chosen so that the shield demagnetizing field exceeds an applied field $H_o$ in a quasistatic test where $H_o$ is between 1 and 10,000 Oe;
   wherein the non-magnetic, electrically insulating material separates the magnetic read head from the magnetic write head such that the first and second magnetic shields are separated from and not a part of the magnetic write head.

2. A head as in claim 1, wherein each of the first and second shields has a thickness between 0.01 and 5 um.

3. A head as in claim 1 wherein SH is between 5 and 50 um.

4. A head as in claim 1, wherein G is less than 1000 nm.

5. A magnetic head having an air bearing surface (ABS) for use in a data recording system, the magnetic head comprising:
   a magnetic write head; and
   a magnetic read head separated from the magnetic write head by a non-magnetic, electrically insulating material, the read head further comprising:
   first and second magnetic shields, each shield having a thickness (ST), the first and second shields being separated by a gap (G); and
   a magnetoresistive sensor sandwiched between the shields;
   wherein each of the shields has a thickness such that ST/G is less than 20 and greater than 2 wherein the first and second shields each have a shield height (SH), a shield width (SW), and a saturation magnetization (Ms(s)) and wherein ST, SW, SH and Ms(s) are chosen so that the shield demagnetizing field exceeds an applied field $H_o$ in a quasistatic test where $H_o$ is between 1 and 10,000 Oe;
   wherein the non-magnetic, electrically insulating material separates the magnetic read head from the magnetic write head such that the first and second magnetic shields are separated from and not a part of the magnetic write head.

6. A head as in claim 5, wherein each of the first and second shields has a thickness between 0.01 and 5 um.

7. A head as in claim 5 wherein SH is between 5 and 50 um.

8. A head as in claim 5, wherein G is less than 1000 nm.

9. A magnetic head having an air bearing surface (ABS) for use in a data recording system, the magnetic head comprising:
   a magnetic read head; and
   a magnetic write head separated from the magnetic write head by a non-magnetic, electrically insulating layer, the read head further comprising:
   first and second magnetic shields, each shield having a thickness (ST), the first and second shields being separated by a gap (G); and
   a magnetoresistive sensor sandwiched between the shields;
   wherein each of the shields has a thickness such that ST/G is less than 10 and greater than 2;
   wherein the first and second shields each have a shield height (SH), a shield width (SW), and a saturation magnetization (Ms(s)) and wherein ST, SW, SH and Ms(s) are chosen so that the shield demagnetizing field exceeds an applied field $H_o$ in a quasistatic test where $H_o$ is between 1 and 10,000 Oe;
   wherein the non-magnetic, electrically insulating material separates the magnetic read head from the magnetic write head such that the first and second magnetic shields are separated from and not a part of the magnetic write head.

10. A head as in claim 9, wherein each of the first and second shields has a thickness between 0.01 and 5 um.

11. A head as in claim 9 wherein SH is between 5 and 50 um.

12. A head as in claim 9, wherein G is less than 1000 nm.

13. A magnetic recording head, comprising:
    a magnetic write element, comprising first and second magnetic poles that are magnetically connected with one another in a back gap region and separated from one another in a pole tip region, and an electrically conductive coil a portion of which passes between the first and second magnetic poles;
    a read head, the read head comprising:
    first and second magnetic shields, each shield having a thickness (ST), the first and second shields being separated by a gap (G); and
    a magnetoresistive sensor sandwiched between the shields;
    wherein each of the shields has a thickness such that ST/G is less than 50 and greater than 2;
    wherein the first and second shields each have a shield height (SH), a shield width (SW), and a saturation magnetization (Ms(s)) and wherein ST, SW, SH and Ms(s) are chosen so that the shield demagnetizing field exceeds an applied field $H_o$ in a quasistatic test where $H_o$ is between 1 and 10,000 Oe; and
    a non-magnetic, electrically insulating material separating the read head from the write head such that the first and second magnetic shields are separated from and not a part of the magnetic write head.

14. A magnetic recording head, comprising:
    a magnetic write element, comprising first and second magnetic poles that are magnetically connected with one another in a back gap region and separated from one another in a pole tip region, and an electrically conductive coil a portion of which passes between the first and second magnetic poles;
    a read head, the read head comprising:
    first and second magnetic shields, each shield having a thickness (ST), the first and second shields being separated by a gap (G); and
    a magnetoresistive sensor sandwiched between the shields;
    wherein each of the shields has a thickness such that ST/G is less than 20 and greater than 2;
    wherein the first and second shields each have a shield height (SH), a shield width (SW), and a saturation magnetization (Ms(s)) and wherein ST, SW, SH and Ms(s) are chosen so that the shield demagnetizing field exceeds an applied field $H_o$ in a quasistatic test where $H_o$ is between 1 and 10,000 OeOe; and
    a non-magnetic, electrically insulating material separating the read head from the write head such that the first and second magnetic shields are separated from and not a part of the magnetic write head.

15. A magnetic recording head, comprising:

a magnetic write element, comprising first and second magnetic poles that are magnetically connected with one another in a back gap region and separated from one another in a pole tip region, and an electrically conductive coil a portion of which passes between the first and second magnetic poles;

a read head, the read head comprising:

first and second magnetic shields, each shield having a thickness (ST), the first and second shields being separated by a gap (G); and a magnetoresistive sensor sandwiched between the shields;

wherein each of the shields has a thickness such that ST/G is less than 10 and greater than 2;

wherein the first and second shields each have a shield height (SH), a shield width (SW), and a saturation magnetization (Ms(s)) and wherein ST, SW, SH and Ms(s) are chosen so that the shield demagnetizing field exceeds an applied field $H_o$ in a quasistatic test where $H_o$ is between 1 and 10,000 OeOe; and a non-magnetic, electrically insulating material separating the read head from the write head such that the first and second magnetic shields are separated from and not a part of the magnetic write head.

16. A suspension assembly, for use in magnetic recording, comprising:

a suspension arm;

a slider connected with the suspension arm;

a magnetic write element formed on the slider, the magnetic write element comprising first and second magnetic poles that are magnetically connected with one another in a back gap region and are separated from one another by a write gap in a pole tip region, and an electrically conductive coil a portion of which passes between the first and second magnetic poles;

a magnetic read head comprising:

first and second magnetic shields, each shield having a thickness (ST), the first and second shields being separated by a gap (G); and a magnetoresistive sensor sandwiched between the shields;

wherein each of the shields has a thickness such that ST/G is less than 20 and greater than 2;

a plurality of electrical leads, electrically connected with the write element; and a plurality of electrical leads, electrically connected with the magnetoresistive sensor;

wherein the first and second shields each have a shield height (SH), a shield width (SW), and a saturation magnetization (Ms(s)) and wherein ST, SW, SH and Ms(s) are chosen so that the shield demagnetizing field exceeds an applied field $H_o$ in a quasistatic test where $H_o$ is between 1 and 10,000 OeOe; and a non-magnetic, electrically insulating material separating the read head from the write head such that the first and second magnetic shields are separated from and not a part of the magnetic write head.

17. A magnetic data recording system, comprising:

a magnetic medium;

a slider;

an actuator connected with the slider for moving the slider adjacent to a surface of the magnetic medium;

a magnetic write element formed on the slider, the magnetic write element comprising first and second magnetic poles that are magnetically connected with one another in a back gap region and are separated from one another by a write gap in a pole tip region, and an electrically conductive coil a portion of which passes between the first and second magnetic poles; and a magnetic read head formed on the slider, the read head comprising:

first and second magnetic shields, each shield having a thickness (ST), the first and second shields being separated by a gap (G); and a magnetoresistive sensor sandwiched between the shields;

wherein each of the shields has a thickness such that ST/G is less than 20 and greater than 2;

wherein the first and second shields each have a shield height (SH), a shield width (SW), and a saturation magnetization (Ms(s)) and wherein ST, SW, SH and Ms(s) are chosen so that the shield demagnetizing field exceeds an applied field $H_o$ in a quasistatic test where $H_o$ is between 1 and 10,000 OeOe; and a non-magnetic, electrically insulating material separating the read head from the write head such that the first and second magnetic shields are separated from and not a part of the magnetic write head.

18. A head as in claim 17, wherein each of the first and second shields has a thickness between 0.01 and 5 um.

* * * * *